Sept. 12, 1961 A. Y. WARNER ET AL 2,999,288
BUCKLE ASSEMBLY
Filed Nov. 23, 1955 2 Sheets-Sheet 1

INVENTORS
ALDEN Y. WARNER
WILBUR J. CRAVEN
BY JOHN STACHERL

Lindsey and Prutzman
ATTORNEYS

Sept. 12, 1961     A. Y. WARNER ET AL     2,999,288
BUCKLE ASSEMBLY
Filed Nov. 23, 1955     2 Sheets-Sheet 2
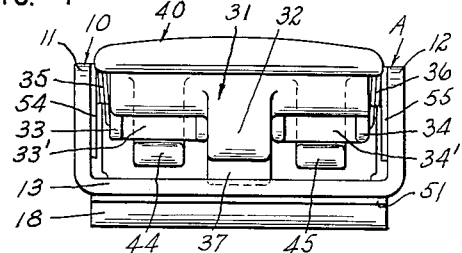
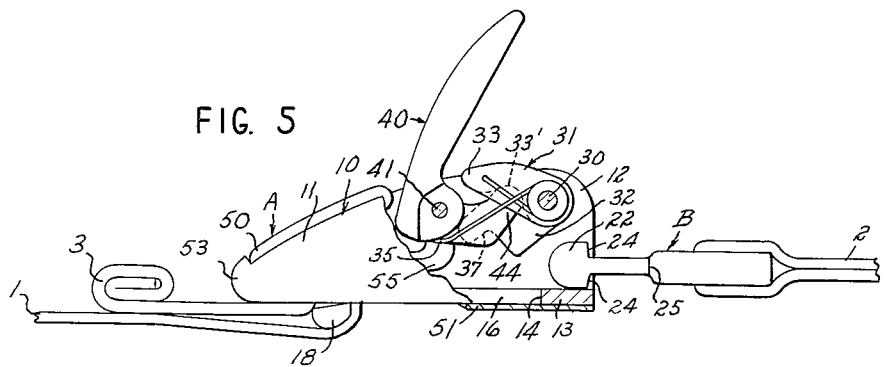
INVENTORS
ALDEN Y. WARNER
WILBUR J. CRAVEN
BY  JOHN STACHERL
Lindsey and Pritzman
ATTORNEYS United States Patent Office 2,999,288
Patented Sept. 12, 1961

2,999,288
BUCKLE ASSEMBLY
Alden Y. Warner, Farmington, Wilbur J. Craven, East Hartford, and John Stacherl, New Britain, Conn., assignors to The Capewell Manufacturing Company, Hartford, Conn., a corporation of Connecticut
Filed Nov. 23, 1955, Ser. No. 548,706
5 Claims. (Cl. 24—230)

The present invention relates to buckles and more particularly to a buckle assembly of novel construction for fastening the ends of safety belts, straps, harnesses, or webbing generally, hereinafter referred to collectively as "belts" or "straps." The device of the present invention has particular utility as a fastener for safety or seat belts of the type used in vehicles, including automobiles and aircraft.

It is an aim of the present invention to provide a buckle assembly which combines optimum safety and strength with simplicity and ease of attachment and separation. As will be realized, a practical safety belt or harness arrangement must be detachable and removable and yet be capable when assembled of withstanding very great and sudden stresses. This is particularly true of safety belts used in aircraft and automobiles where, in case of a sudden stop by accident or otherwise, the wearer may exert a force against the belt of thousands of pounds. It therefore is essential that a buckle be provided which can withstand considerable and sudden tensions and which preferably can develop or utilize the full strength of the webbing with which it is used. Also, since safety belts and buckles are frequently used by persons having little knowledge of such devices, it is an aim to provide a buckle assembly whereby the safety harness or belt may be attached and detached in a simple manner upon a minimum of instruction. Included in this aim is the provision of a safety buckle assembly which cannot be assembled improperly and which can be released with a minimum of effort, and manipulation particularly following the application of a severe load. The latter is particularly important in the event the user is injured or partially incapacitated.

Another aim of the invention is to provide a buckle having a positive locking engagement which cannot be disengaged whether by tightness or looseness of the webbing or by inertia, centrifugal force, etc., to which the buckle might be subjected, particularly in aircraft and automobile installations. A more specific object of the invention is to accomplish the forgoing aims in a structure which is simple and compact and capable of economical fabrication and assembly at moderate cost.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

FIG. 4 is an end view of the buckle with the strap and fitting removed; and

FIG. 5 is a fragmentary view similar to FIG. 2 and showing the parts in separating relationship.

Figure 1:
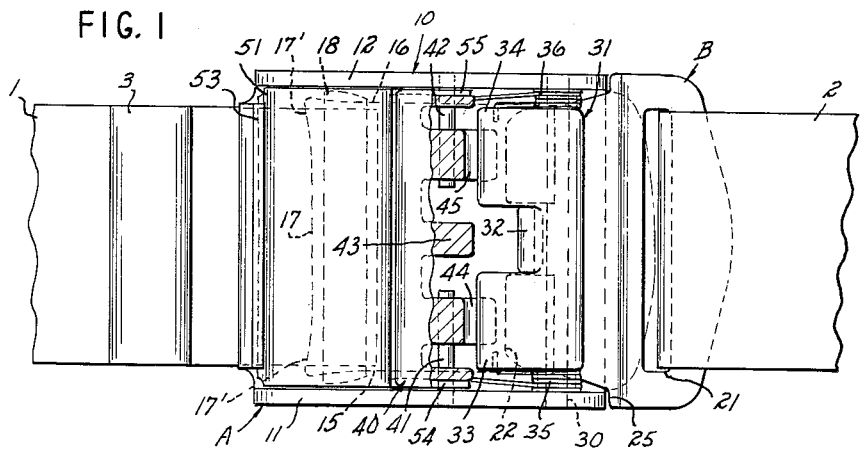
FIG. 1 is a top view of a buckle assembly constructed in accordance with the invention with a portion of the release lever cut away to show the inner parts.

Referring to the drawings the buckle assembly shown therein and constructed in accordance with the invention comprises a main unit A herein referred to as the "buckle" and a separable strap endpiece or fitting B. In the embodiment shown in the drawings, the buckle assembly is utilized to attach or connect together the two straps indicated at 1 and 2. Of course, it will be realized that the use of the buckle assembly may be varied depending upon the particular harness or safety belt arrangement with which it is associated. For example, it is contemplated that the main unit or buckle A may be permanently attached to a frame member instead of a strap, if desired, and that more than one strap endpiece or fitting B may be utilized, all without departing from the scope of the invention.

Figure 2:
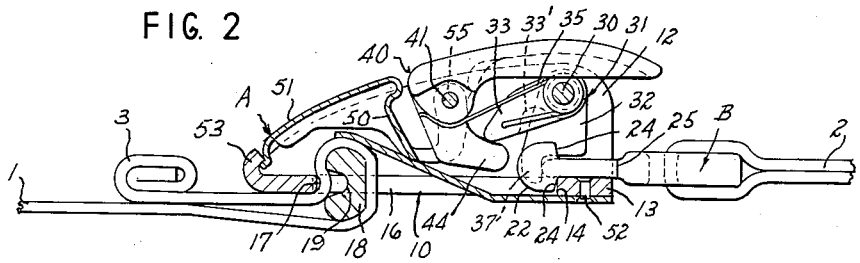
FIG. 2 is a side view of the buckle with the frame and cover in cross-section.

Turning now to the details of the construction of the main unit or buckle A, it will be seen that it comprises a generally oblong frame 10 having upstanding integral side walls 11, 12. The base of the frame 10 is centrally apertured to form a front ledge 13 having an inwardly facing shoulder 14, side edges 15, 16 and a rear shoulder 17. The frame 10 is adapted to be anchored or attached to a strap in any suitable manner. In the specific embodiment shown in the drawings, an adjustable strap connector for the strap end 1 is built into the buckle A and this comprises a bar 18 having notched ends (not shown) for engaging the side edges 15, 16 and having a longitudinal groove 19 facing the rear inwardly facing shoulder 17. The bar 18 is thus slidable on the frame toward and away from the shoulder 17 and preferably is loose enough so as to permit a limited pivoting movement. In order to attach the strap end 1 to the buckle, it is simply looped around the periphery of the bar 18 and then brought back between the bar and the shoulder 17 as best shown in FIG. 2 of the drawings. When tension is placed on the strap end 1, the bar 18 is drawn toward the shoulder 17 to firmly engage the webbing between the bar and the frame of the buckle to thereby prevent any slipping of the strap end. The effective length of the strap 1 may be decreased by merely drawing the strap through the buckle by means of the free end 3 thereof. To quickly and easily increase the effective length of the strap, the buckle A is tilted clockwise, as viewed in FIG. 2 to an extent necessary to space the belt away from the side of the bar opposite the groove 19 whereby tensile load on the strap 1 will result in the belt being drawn through the buckle. In accordance with the invention, the ends of the shoulder 17 are relieved as indicated at 17' to produce a substantial increase in the utilization of the strength of the webbing. While it is not desired to be restricted to any specific theory of operation, nonetheless it is believed that the reason for the improved utilization of the strength of the webbing, particularly with tightly woven webbing, is that when the strap or webbing is compressed between the shoulder 17 and bar 18 it is expanded laterally into cutting engagement with the frame. By relieving the ends of the shoulder 17 at 17' there is provided additional space to permit lateral expansion of the webbing which avoids fracture of the webbing upon the application of tensions greatly exceeding those which would normally cause fracture.

It has been found that when the strap is fabricated from certain materials having spring like characteristics such as plastic impregnated or coated fabrics there may be a tendency of the strap to spring apart about the bar 18 if there is little or no tensile load on the strap end 1. This spring action serves to remove the endwise force in the bar 18 in the direction of the rear shoulder 17 and permit the portion of the strap between the bar 18 and the shoulder 17 to straighten out and urge the bar towards the front ledge 13 of the frame. There is then the possibility that vibration of the buckle, such as might occur when the buckle is worn in an aircraft or in an automobile traveling over a rough surface, will cause the free end portion of the strap to walk through the buckle to undesirably increase the effective length of the strap. Therefore, in accordance with the invention a resilient plate member 60 is mounted at one end to the frame at 52 such as by rivets and extends therefrom towards the other end of the frame. Intermediate its ends the plate 60 is inclined toward the handle 40 to form a finger portion 61 having an end portion constructed to resiliently engage the outer surface of the strap 1 as at 62 to prevent the strap from springing outwardly and urging the bar 18 toward the shoulder 14 and further prevent the free end of the strap from being moved about the bar and through the buckle. The force exerted on the strap by the finger 61 should be, of course, sufficient to attain the desired result yet insufficient to seriously hinder easy adjustment of the effective length of the strap.

The strap endpiece or fitting B may be attached to the strap end 2 in any desired manner. In the embodiment shown in the drawing, the fitting B is provided with an integrally formed D-ring 21 of somewhat increased thickness to which the strap end 2 may be conveniently attached by sewing or otherwise fastening the portions of the strap end which overlap after being looped through the D-ring 21. The forward end of the fitting B is provided with an enlarged head 22 extending transversely of the fitting and centrally notched as indicated at 23. The head 22 is generally bulbous in cross-section and provides the rearwardly facing transverse shoulders 24. For proper functioning of the buckle assembly it would be sufficient to provide a head 22 extending laterally from only one side of the fitting, but it is preferred to make the fitting B symmetrical so that the fitting will still function even though inverted.

Figure 3:
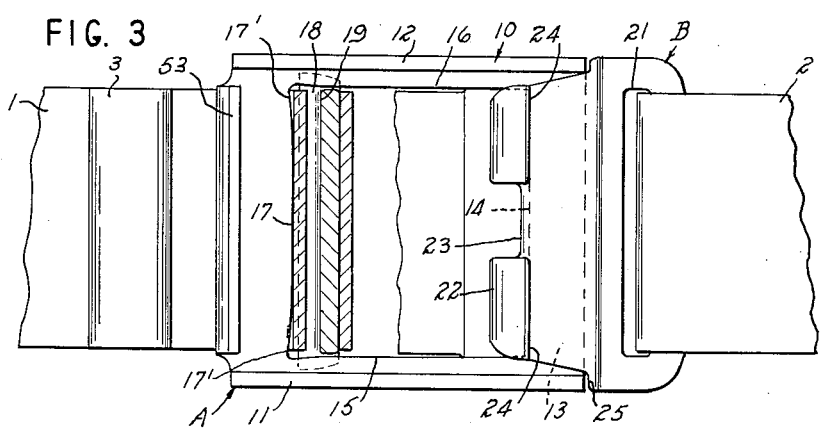
FIG. 3 is a plan view of the buckle with the release lever and holding bar removed and with the cover and strap connection of the buckle in cross-section.

As best shown in FIGS. 2 and 3, the fitting B is connected to the buckle A merely by inserting and sliding the fitting across the forward ledge 13 of the frame until the head 22 catches behind the shoulder 14 of the frame with the adjacent shoulder 24 of the fitting seated against the shoulder 14 and thus providing a positive interlocking engagement preventing longitudinal separation of the buckle and fitting.

Pivotally mounted above the ledge 13 on a pin 30 extending between the side walls 11, 12 is a retaining member 31 having a central portion 32 adapted to be accommodated in the notch 23 of the fitting B and two angularly related arm portions 33, 34 by means of which the same may be actuated by the handle 40 which also is pivotally mounted on the side walls 11, 12 by means of pivot pins 41, 42. The retaining member 31 is urged in a counterclockwise direction as viewed in FIG. 1 of the drawings by means of coil springs 35, 36, anchored at one end on the arm portions 33, 34 and bearing, at their other end, against the sub of the handle 40. Counterclockwise movement of the retaining member 31 is limited by engagement of a projection 37 on the central portion 32 which engages either with the forward end of the fitting B or with the shoulder 14.

As will be appreciated, when the fitting B is inserted into the buckle A along the forward ledge 13, it will encounter the central portion 32 of the retaining member 31 which by reception in the notch 23 will tend to center the fitting B. As the fitting is pushed inwardly enough to bring the head 22 beyond the ledge 13, the retaining member 31 will pivot inwardly to permit the insertion of the head 22 and at the same time tend to cam it downwardly into seating position against the shoulder 14. Upon seating of the fitting B, the retaining member 31 will then swing to the retaining position shown in FIG. 2 of the drawings under the influence of springs 35, 36. Preferably, the springs 35, 36 are made strong enough so that if the fitting B is not inserted sufficiently to cause it to seat on the shoulder 14, the fitting will be ejected from the buckle, thus showing that a proper attachment has not been made.

As will be apparent from a consideration of FIG. 2, the function of the retaining member 31 is merely to insure that the head 22 of the fitting will remain in seated position against the shoulder 14. The main tensioning force applied to the straps 12, is, of course, absorbed by the interengagement of the shoulders 14 and 24 of the frame and the fitting respectively. In the preferred embodiment, the shoulders 24 are slightly beveled to assist in disengaging the fitting from the shoulder 14 and prevent hang-up but the bevel is so slight that a very small component of force is exerted in an upward direction. In any event, any force transmitted upwardly against the retaining member 31 will not operate to dislodge the same from retaining position as shown in FIG. 2 because the surface of the portion 32 engaged by the fitting will be to the right of the pivotal axis of the member 31, as viewed in FIG. 2, thus tending to move the member 31 into retaining engagement with the fitting. Further, the fitting B is provided with shoulders as at 25 intermediate the D-ring 21 and head 22 which cooperate with the adjacent ends of the side walls 11 and 12 of the frame to limit movement of the fitting B inwardly of the buckle and pivoting of the buckle about the front ledge 13, the combination of which might cause the retaining member 31 to be pivoted in a clockwise direction as viewed in FIG. 2 and possibly result in inadvertent disengagement of the fitting and buckle.

The releasing handle 40 is integrally formed with a central strengthening rib 43 and cam fingers 44, 45 for coaction with the arm portions 33, 34 of the retaining member. The rib 43 also serves as a means to limit the opening movement of the retaining member 31 by interference with the projection 37 of the retaining member as shown in FIG. 5. The handle 40 is preferably plate-like in shape so as to appear as a continuation of the surface 51 of a baffle 50 which is engaged at one end underneath a curved lip 53 formed on the rear edge of the frame 10. The baffle 50 is provided with side flanges 54, 55 which strengthen and position the other end of the baffle, the flanges 54, 55 being apertured for connection to the pivot pins 41, 42 of the handle 40. The baffle 50 has no mechanical function and is utilized partly for decorative purposes and partially as a cover for the operating parts.

Inasmuch as the arm portions 33, 34 of the retaining member 31 bear against the fingers 44, 45, it will be appreciated that the handle 40 will normally be retained in the position shown in FIG. 2. At the same time the retaining member 31 can move in a clockwise direction independently of the handle 40 so as to permit the insertion of the fitting B, without requiring movement of the handle 40. In order to release the fitting B from the buckle A, it is only necessary for the user to grasp the forward end of the handle 40 and pivot it in a counterclockwise direction as viewed in FIG. 2 of the drawings which will thereupon move the parts to the position shown in FIG. 5 of the drawings and permit release of the fitting B. As best shown in FIG. 2 of the drawings, the end of the handle 40 projects forwardly of the frame 10 to permit it to be easily grasped by the user.

The fingers 44, 45 of the handle 40 are slightly arcuate on the upper surface thereof as best shown in FIG. 2 of the drawings and the ends thereof are accommodated in the pockets 33', 34' of the arm portions 33, 34 respectively, in the full opening position of the buckle illustrated in FIG. 5 of the drawings. By reason of the design of the fingers 44, 45 of the arm portions 33, 34 just described, there is provided a variable speed connection providing optimum opening force at the beginning of the releasing movement followed by acceleration of the movement of the retaining member 31 as the handle is moved to fully opened position. Since it is impossible for the fitting B to apply any substantial pressure to the retaining member 31, and there is a considerable mechanical advantage provided by the design of the handle 40, it will be appreciated that the buckle can be released with a minimum application of force by the user.

The construction of the handle 40 and retaining member 31 is such that the weight of the moving parts is distributed in a manner so that even though the buckle assembly is subjected to sudden movements, jolts, etc., it is unlikely that the parts will be pivoted by inertia or momentum to a disengaging position. Also, because the handle 40 is pivoted so that it extends toward the fitting B and not toward the adjustable strap end 1, it is unlikely that the handle 40 will be engaged by the free end 3 of the strap 1 and thus be inadvertently moved to disengaging position. Further, the direction of the releasing force as applied to the handle 40 is such that normal operation of the handle will result in a definite separation of the parts and not merely a partial separation and because of the direction in which the handle extends in combination with the direction of opening movement of the handle, there can be no confusion of the motion required to lengthen the belt for comfort with the motion required to release the buckle, thus precluding the happening of an inadvertent occurrence which might adversely affect the safety of the wearer. The manner of retaining the fitting B within the buckle eliminates any need for a threading of the strap 2 within the buckle and thus reduces the time required to assemble the buckle as well as eliminating the complexity of assembly and as should be apparent from the foregoing description, the buckle inherently promotes the ability of the wearer to operate the buckle to perform all functions thereof with either hand unaided.

It thus will be seen that there has been provided in acocrdance with the invention a buckle assembly of simple and economical construction which will withstand a maximum separating force without a transmission of such force to the operating or retaining members which otherwise might become wedged and prevent subsequent release or which might be subjected to breakage or other failure. The buckle assembly is simple to use and provides a maximum of safety under varying conditions of operation.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim:

1. A buckle assembly comprising a channel-shaped frame having an inwardly facing transverse abutment and upstanding side portions, a separable fitting for attachment to a belt having a head at one end forming a pair of transverse shoulders facing oppositely to said transverse abutment of the frame, said fitting overlying a portion of the frame adjacent said transverse abutment in operative assembly with either shoulder of the head interengaged with the abutment of the frame to prevent longitudinal withdrawal of the fitting relative to the frame, a retainer member, pivot means on said side portions of the frame rotatably mounting said retainer member thereon for rotation about an axis extending transversely of the frame and spaced from and in alignment with said portion of the frame overlain by said fitting, said retainer member engaging the overlying portion of the fitting to prevent movement thereof in a direction normal to the frame and being rotatable into a non-obstructing position to permit insertion and withdrawal of the fitting, and means biasing said retainer member into fitting engaging position.

2. A buckle assembly comprising a frame having a transverse abutment, a separable fitting for attachment to a belt having a bifurcated transverse abutment forming a pair of spaced transverse shoulders facing in a direction opposite to the abutment of the frame, said fitting overlying a portion of the frame adjacent said transverse abutment in operative assembly with the shoulders thereof interengaged with the frame abutment to prevent longitudinal withdrawal of the fitting relative to the frame, a retainer member engaged with the fitting between the spaced shoulders thereof to prevent movement of the fitting in a direction normal to the frame, pivot means on the frame rotatably mounting said retainer member on the frame, said pivot means being spaced from and in alignment with said portion of the frame overlain by said fitting, said retainer member being pivotable thereon from its position in engagement with said fitting into a non-obstructing position for movement of the fitting normal to the frame, and spring means biasing said retainer member into engagement with said fitting.

3. A buckle assembly comprising a channel-shaped frame having a base portion producing an inwardly facing transverse shoulder and upstanding side walls, a separable fitting for attachment to a belt having a bifurcated enlargement at one end forming a pair of spaced transverse shoulders facing oppositely to said transverse shoulder of the frame, said fitting overlying a portion of the frame adjacent said shoulder in operative assembly with the shoulders of the enlargement interengaged with the shoulder of the frame to prevent longitudinal withdrawal of the fitting relative to the frame, a retainer member having a depending portion and engaged with the overlying portion of said fitting between the spaced shoulders thereof with the depending portion projecting downwardly between the spaced shoulders to prevent movement of the fitting normal to the frame, a projecting arm on said retainer member, pivot means on said side walls rotatably mounting said retainer member on the frame for rotation about an axis extending transversely of the frame and spaced from and in alignment with said portion of the frame overlain by said fitting, said retainer member being pivotable into a non-obstructing position for movement of the fitting normal to the frame and disengagement of the shoulder, a handle pivotably mounted on the frame and having a cam finger thereon engageable with the projecting arm on the retainer member, said retainer being pivotable by rotation of the handle into a non-obstructing position for movement of the fitting normal to the frame, and a spring urging the retainer member into engagement with the fitting.

4. In a buckle assembly for fastening a safety belt, a channel-shaped frame having a flat base portion with an aperture therein providing a transverse shoulder at one end thereof and upstanding side walls, a separable fitting having a bifurcated enlargement at one end forming a pair of spaced transverse shoulders facing oppositely to the transverse shoulder of the frame, and having a pair of longitudinally spaced, aligned side shoulders, said fitting overlying a portion of the frame adjacent said transverse shoulder in operative assembly with the shoulders of the enlargement interengaged with the shoulder of the frame to prevent longitudinal withdrawl of the fitting relative to the frame and with the side shoulders abutting the side walls of the channel-shaped frame, a retainer member having a depending portion, pivot means on the side walls of the frame rotatably mounting said retainer member thereon for rotation about an axis extending transversely of the frame and spaced laterally of and in alignment with said portion of the frame overlain by said fitting, said retainer member engaging the overlying portion of said fitting between the spaced shoulder thereof with the depending portion projecting downwardly between the spaced shoulders to prevent movement of the fitting in a direction normal to the frame, an actuating arm on said retainer member, a handle pivotably mounted on said frame forming a cover therefor and having a cam finger engageable with the arm on said retainer member, said retainer member being pivotable into a non-obstructing position by rotation of said handle for disengaging movement of the fitting in a direction normal to the frame, and a spring urging the retainer member into fitting-engaging position.

5. A buckle assembly comprising a frame having a transverse abutment, a separable fitting for attachment to a belt having an end portion providing a transverse abutment extending away from the plane of the major portion of said fitting and facing in a direction opposite to the abutment of the frame, said fitting overlying the portion of the frame adjacent said transverse abutment in operative assembly and with the abutment thereof interengaged with the frame abutment to prevent longitudinal withdrawal of the fitting relative to the frame, a retainer member, pivot means on the frame rotatably mounting said retainer member thereon, said pivot means being spaced from and in alignment with said portion of the frame which is overlain by said fitting, said retainer member being pivotable from a position in engagement with the overlying portion of said fitting to prevent movement of the fitting in a direction normal to the frame and into a non-obstructing position.

References Cited in the file of this patent

UNITED STATES PATENTS

| | | |
|---|---|---|
| 1,275,034 | Huxley | Aug. 6, 1918 |
| 1,881,799 | Mashek | Oct. 11, 1932 |
| 2,368,283 | Zola | Jan. 30, 1945 |
| 2,458,810 | Varney et al. | Jan. 11, 1949 |
| 2,590,851 | Elsner | Apr. 1, 1952 |
| 2,631,350 | Parker | Mar. 17, 1953 |
| 2,710,999 | Davis | June 21, 1955 |
| 2,904,866 | Carter | Sept. 22, 1959 |

FOREIGN PATENTS

| | | |
|---|---|---|
| 711,940 | France | July 8, 1931 |
| 729,523 | Germany | Dec. 17, 1942 |